(12) United States Patent
Brockway

(10) Patent No.: US 8,197,157 B2
(45) Date of Patent: Jun. 12, 2012

(54) COMPACTION WHEEL CLEAT

(75) Inventor: Robert John Brockway, Scottsboro, AL (US)

(73) Assignee: Terra Compactor Wheel Corp., Scottsboro, AL (US)

( * ) Notice: Subject to any disclaimer, the term of this patent is extended or adjusted under 35 U.S.C. 154(b) by 128 days.

(21) Appl. No.: 12/619,734

(22) Filed: Nov. 17, 2009

(65) Prior Publication Data
US 2011/0116866 A1 May 19, 2011

(51) Int. Cl.
*E01C 19/26* (2006.01)
*B60B 15/02* (2006.01)

(52) U.S. Cl. .................. 404/124; 404/121; 404/122

(58) Field of Classification Search .............. 404/121, 404/124; 37/452, 453, 455
See application file for complete search history.

(56) References Cited

U.S. PATENT DOCUMENTS

| | | | | |
|---|---|---|---|---|
| 4,074,942 A | * | 2/1978 | Cochran | 404/121 |
| 4,530,620 A | * | 7/1985 | McCartney | 404/121 |
| 4,668,122 A | * | 5/1987 | Riddle | 404/121 |
| 4,913,581 A | * | 4/1990 | Weiler | 404/117 |
| 4,950,102 A | * | 8/1990 | Zeitz | 404/121 |
| 5,217,321 A | * | 6/1993 | Corcoran et al. | 404/121 |
| D338,898 S | * | 8/1993 | Corcoran et al. | D15/28 |
| 5,687,799 A | * | 11/1997 | Greenfield et al. | 172/540 |
| 5,967,242 A | * | 10/1999 | Caron et al. | 172/817 |
| 6,632,045 B1 | * | 10/2003 | McCartney | 404/72 |
| 6,712,551 B2 | * | 3/2004 | Livesay et al. | 404/124 |
| 6,837,649 B2 | * | 1/2005 | Livesay et al. | 404/124 |
| 7,198,333 B1 | * | 4/2007 | Freeman | 301/43 |
| 2010/0247242 A1 | * | 9/2010 | Gibbins | 404/124 |
| 2012/0003041 A1 | * | 1/2012 | McPhail et al. | 404/121 |
| 2012/0003042 A1 | * | 1/2012 | McPhail et al. | 404/121 |

* cited by examiner

*Primary Examiner* — Raymond W Addie
(74) *Attorney, Agent, or Firm* — Ziolkowski Patent Solutions Group, SC

(57) ABSTRACT

A compactor wheel having a compactor cleat mountable on a compactor wheel is disclosed. The compactor cleat includes a base affixable to a compactor wheel and a body secured to the base and extending radially outward from the base, with the body comprising an arrangement of protrusions generally dividing the body into four protrusion quadrants. Each of the four protrusion quadrants is angled away from other respective protrusion quadrants such that forcing the protrusions of the cleat into a malleable material causes the malleable material to diversify along the four protrusion quadrants.

22 Claims, 6 Drawing Sheets

COMPACTION WHEEL CLEAT

BACKGROUND OF THE INVENTION

The invention relates generally to compaction machines, such as those used to compact landfills and, more particularly, to a compactor wheel on such a compaction machine having a plurality of cleats thereon for reducing the amount of waste build-up on the compactor wheel.

Compaction machines are used to compact landfill sites, garbage dumps and other such locations. These machines typically include a self-propelled vehicle having four large compactor wheels made of steel. Each compactor wheel has a hub mounted to one end of an axle and a rim disposed around and radially out from the hub. The rim typically includes an outer wrapper on which a plurality of cleats is usually mounted. The design of conventional compactor wheels, and in particular the compactor wheel cleats, varies widely. In general, the cleats are designed to compress (i.e., compact) the waste by concentrating the weight of the compaction machine on the relatively small area of the cleats. The cleats also function to break apart waste by imparting breaking forces thereon.

One problem encountered with existing cleat designs is that waste can build-up on the cleats over time. That is, as the compactor wheel traverses the surface of the landfill and waste is compressed by the cleats, waste may build-up in crevices/depressions in the cleat, or may be punctured by the cleat and thereby become stuck on the cleat. Such accumulation of debris on the cleats is undesirable, as it minimizes the efficiency of the cleats with respect to its ability to impart compression and breaking forces on the waste being compacted and to provide traction to the compaction machine.

It would therefore be desirable to have a system and method capable of providing a cleat that minimizes the build-up of waste thereon. It would further be desirable for such a cleat to provide efficient compression and breaking forces on the waste being compacted.

BRIEF DESCRIPTION OF THE INVENTION

Embodiments of the invention provide a compactor wheel and compaction cleat mounted thereon, the compaction cleat configured to reduce the amount of refuse build-up on the compactor wheel and provide a divisive cutting force to waste being compacted by the compactor wheel.

In accordance with one aspect of the invention, a compactor cleat mountable on a compactor wheel includes a base affixable to a compactor wheel and a body secured to the base and extending radially outward from the base, with the body comprising an arrangement of protrusions generally dividing the body into four protrusion quadrants. Each of the four protrusion quadrants is angled away from other respective protrusion quadrants such that forcing the protrusions of the cleat into a malleable material causes the malleable material to diversify along the four protrusion quadrants.

In accordance with another aspect of the invention, a compactor cleat mountable on a compactor wheel includes a base affixable to the compactor wheel and a body secured to the base. The body of the compactor cleat further includes a center protrusion extending upward from the base and generally dividing the cleat into an equal first region and a second region, wherein the center protrusion includes a front surface, a back surface, and two side surfaces that each extend up to a crest. The body of the compactor cleat also includes a pyramidal protrusion extending upward from the base, the pyramidal protrusion being bisected by the center protrusion such that a first portion of the pyramidal protrusion extends outwardly from the front surface of the center protrusion and a second portion of the pyramidal protrusion extends outwardly from the back surface of the center protrusion. The first portion of the pyramidal protrusion further divides the first region of the cleat into a first quadrant and a second quadrant, and wherein the second portion of the pyramidal protrusion further divides the second region of the cleat into a third quadrant and a fourth quadrant.

In accordance with yet another aspect of the invention, a compactor wheel mountable on an axle of a compaction machine includes a hub mountable to an axle of a compaction machine and a rim mounted around an outer circumference of the hub, the rim having a wrapper, an inner circumferential edge, and an outer circumferential edge. The compactor wheel also includes a plurality of cleats affixed to the wrapper, with each of the plurality of cleats further including a base affixable to a compactor wheel and a body secured to the base and extending radially outward from the compactor wheel, the body comprising an arrangement of protrusions generally dividing the body into four protrusion quadrants. Each of the four protrusion quadrants is angled away from other respective protrusion quadrants such that items forced onto the body are pushed in four distinct directions corresponding to the four protrusion quadrants.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION OF THE PREFERRED EMBODIMENT

Figure 1:
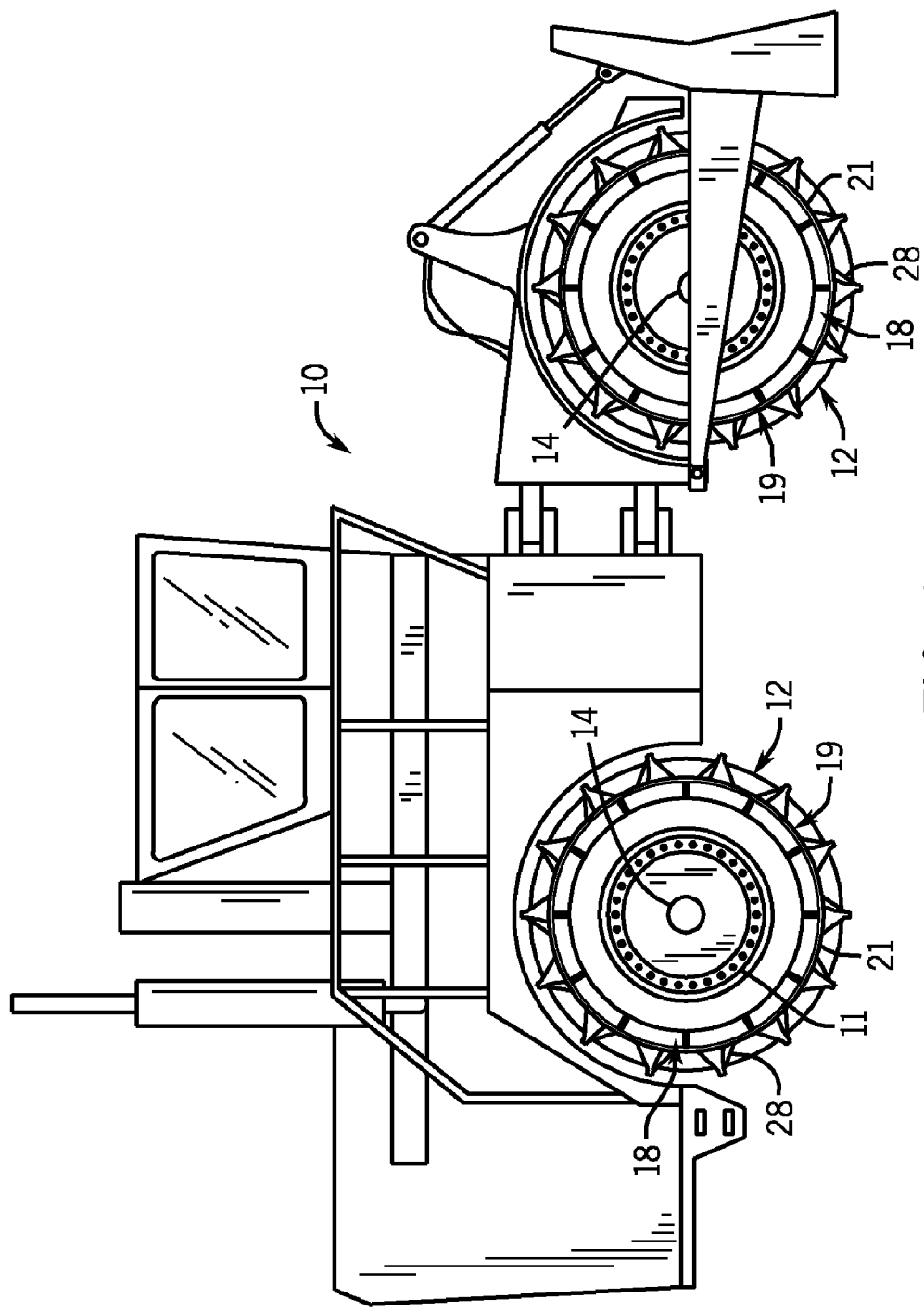
FIG. 1 is a side view of a compaction machine having compactor wheels mounted thereon for use with embodiments of the invention.

Referring to FIG. 1, a compaction machine 10 is shown and includes compactor wheels 12 mounted on the axles 14 of the compaction machine 10. The present invention is not intended to be limited to any particular type of compaction machine 10 and may be used on any suitable compaction machine. The wheels 12 include a hub 11 adapted, for example, with a plurality of bolt holes for being bolted or otherwise mounted to the axle 14. A rim 18 is mounted around the hub 11. The rim 18 includes a wrapper 19 with an outer face or surface 21 on which a plurality of cleats 28 (i.e., teeth) are mounted, such as by welding or any other suitable technique. The cleats 28 can be mounted in any of a variety of patterns, as desired, such as being aligned in a plurality of rows, for example.

Figure 2:
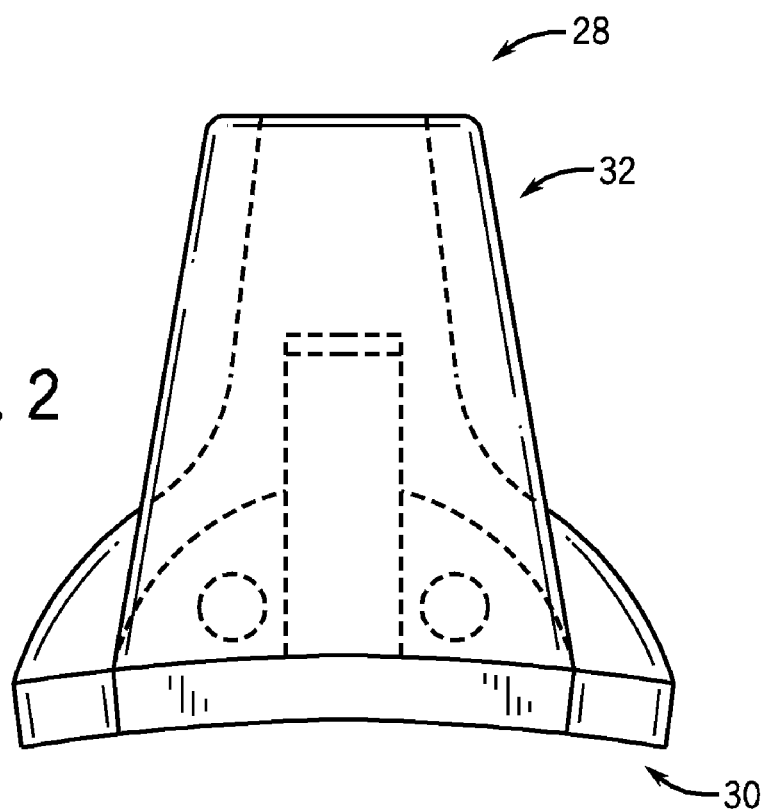
FIGS. 2 and 3 are views of a compactor wheel cleat according to an embodiment of the invention.
Figure 3:
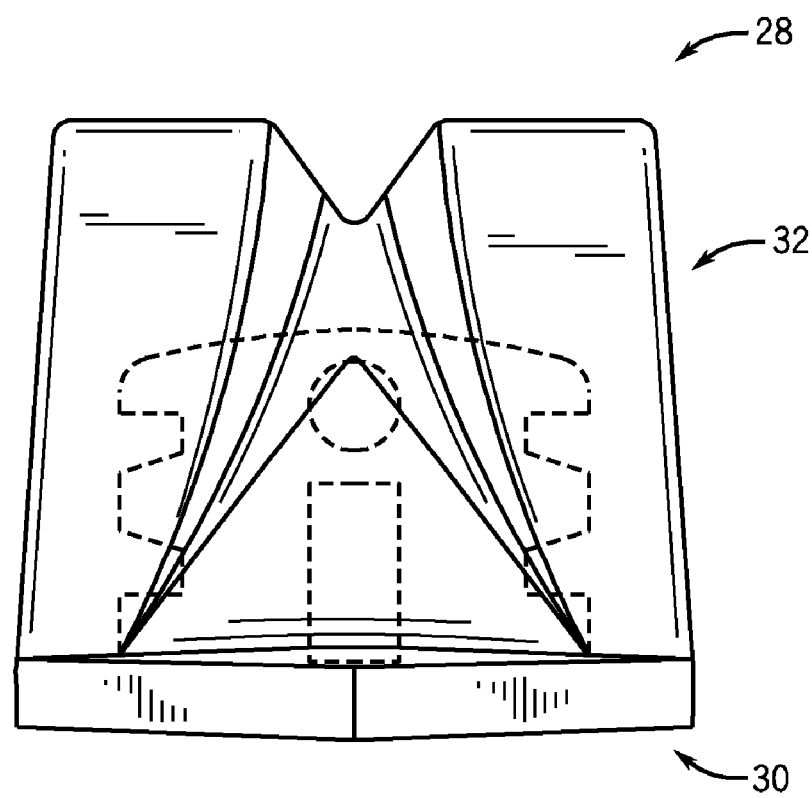

Referring to FIGS. 2 and 3, construction of cleat 28 is shown according to an exemplary embodiment of the invention. Cleat 28 is formed having a generally two-part construction, with a base member 30 (i.e., base) securable to wrapper 19 (FIG. 1) and a body 32 extending radially outward from the base 30. Base 30 may be formed of a first material conducive for welding to wrapper 19, such as a mild carbon A136 steel, for example, that can be hammer forged to a desired shape. Body 32 may be formed of a second material having optimal abrasion/wear resistance properties, such as a high chromium steel, for example, that can be casted into a desired shape and secured onto base 30, as will be explained in greater detail below.

Figure 4:
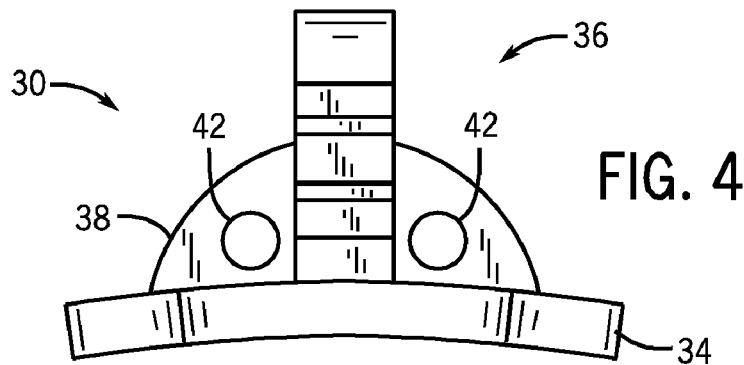
FIGS. 4-6 are views of a cleat base member according to an embodiment of the invention.
Figure 5:
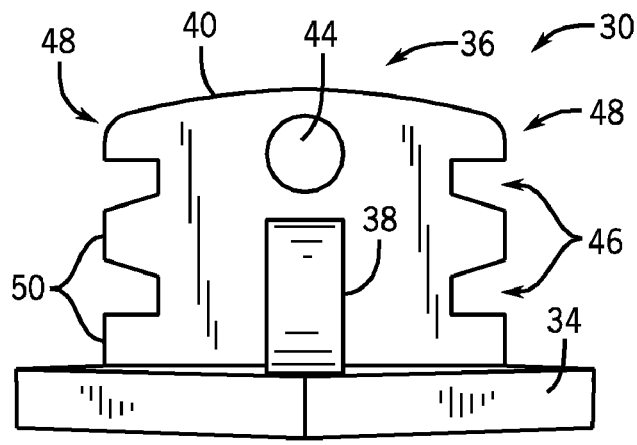
Figure 6:
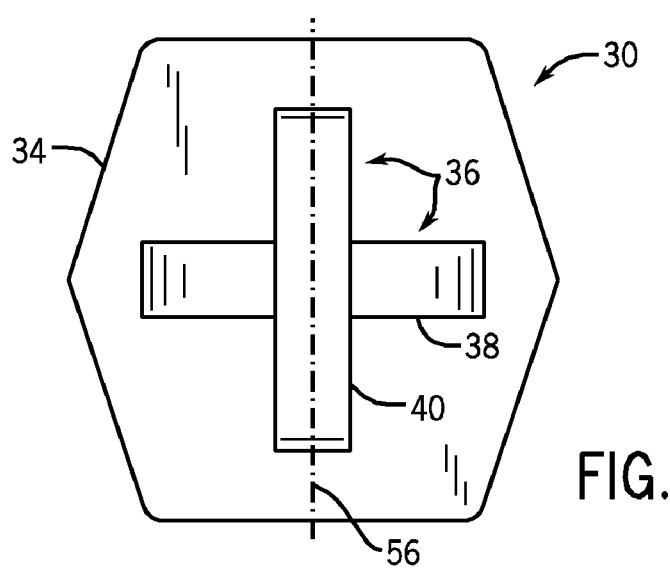

Base 30 is shown in greater detail in FIGS. 4-6, and is formed to have a generally hexagonal shape that is adapted for welding to wrapper 19 (FIG. 1) in a conventional way. The base 30 includes a generally hexagonal shaped planar bottom portion 34 that is to be welded to the wrapper, and also includes a plurality of walls or protrusions 36 extending up perpendicularly from the bottom portion 34. According to an embodiment of the invention, a first wall 38 and a second wall 40 extend up perpendicularly from the bottom portion 34 and are arranged in a cross-shaped orientation. First wall 38 is formed in a semi-circular shape and includes therein a pair of openings 42. Second wall 40 is formed in a generally rectangular shape and bisects the first wall 38 in area between openings 42 formed in the first wall. Second wall 40 has a height greater than that of first wall 38, and second wall 40 includes an opening 44 formed therein in an area above which first wall 38 bisects second wall 40. Second wall 40 also includes therein a plurality of notches 46 formed in opposing edges 48 thereof. Notches 46 are formed in each edge of second wall 40 and extend inwardly, thereby creating a textured edge having a plurality of formations 50 thereon.

According to embodiments of the invention, the openings 42 of first wall 38 and the openings/formations 44, 50 of second wall 40 present features by which body 32 (FIGS. 2 and 3) can be mated with base 30. That is, as body 32 is casted onto base 30, according to an embodiment of the invention, portions of body 32 will be formed that extend through openings 42, 44 and about formations 50, thereby securing the body to base 30.

Figure 7:
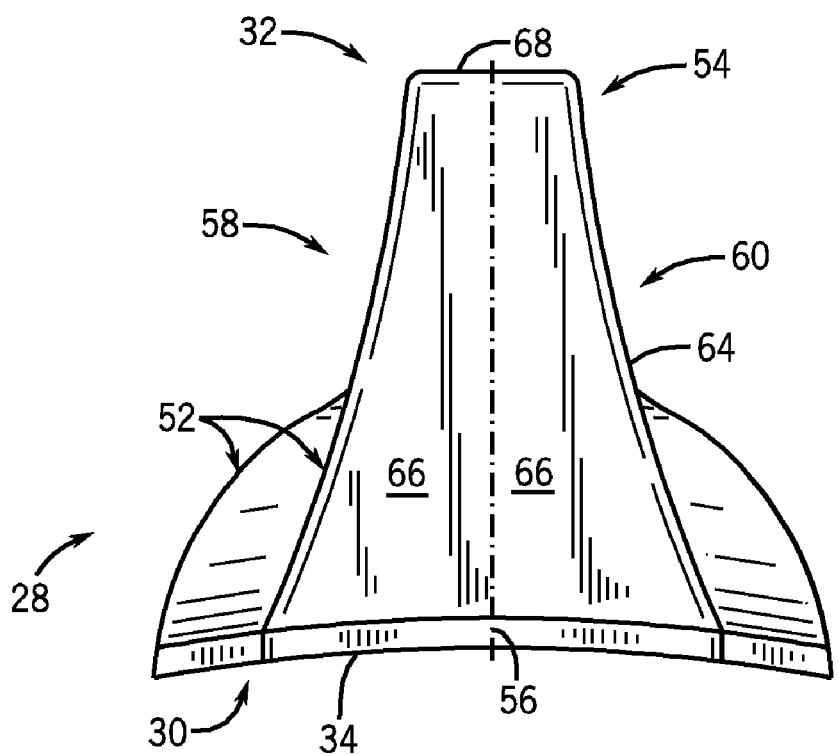
FIGS. 7-9 are views of a cleat body according to an embodiment of the invention.
Figure 8:
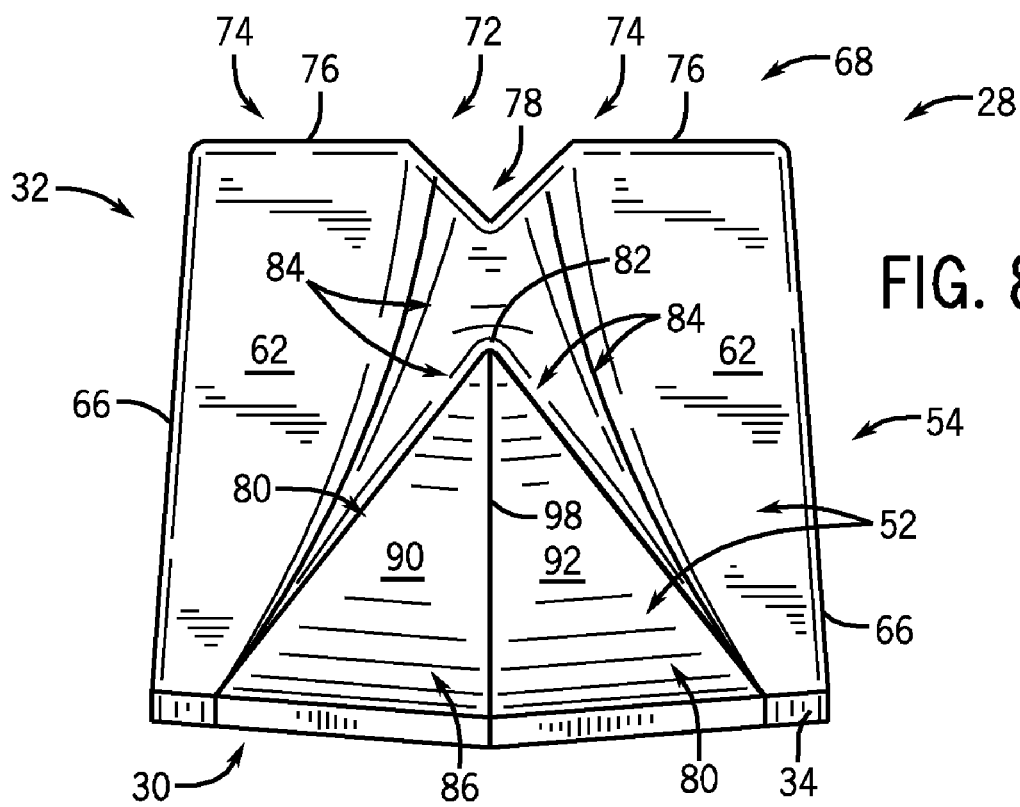
Figure 9:
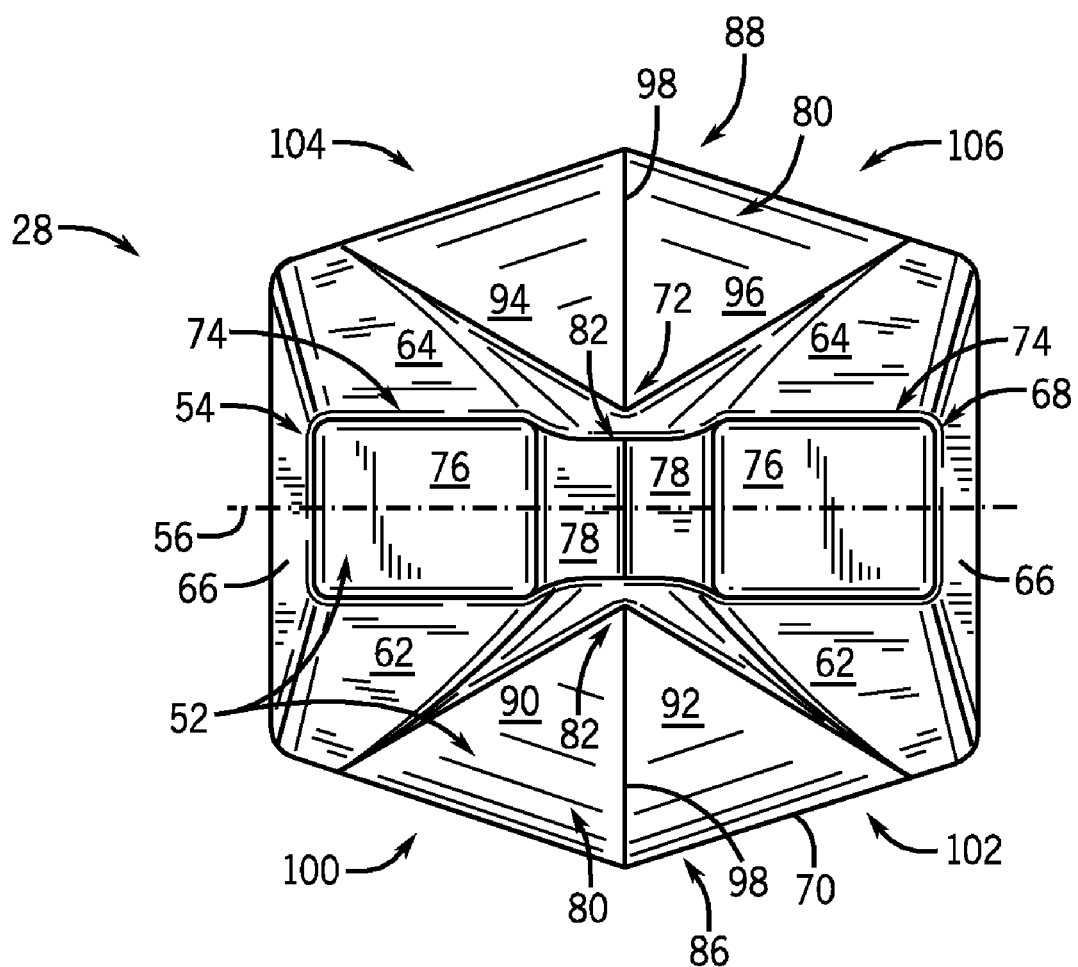

Referring now to FIGS. 7-9, body 32 is shown in greater detail as including an arrangement of protrusions 52 that extend radially outward from the bottom portion 34 of base 30 and away from wrapper 19 of wheel 12 (FIG. 1). The arrangement of protrusions 52 includes a flange-like center protrusion 54 (i.e., center flange) extending upward from the base 30 and along a centerline 56 thereof, thereby generally dividing the cleat 28 into an equal first region 58 and a second region 60. The center protrusion 54 includes a front surface 62, a back surface 64, and two side surfaces 66, with each of the surfaces extending from where body 32 mates with bottom portion 34 of base 30 up to an upper ridge 68 (i.e., crest) of the body 32. Each of front surface 62, back surface 64, and side surfaces 66 are formed at an angle so as to slope upwardly and inwardly from a perimeter 70 of base 30 to upper ridge 68 of center protrusion 54. According to an embodiment of the invention, front and back surfaces 62, 64 are formed as curved surfaces sloping upwardly and inwardly from perimeter 70 of base 30 to upper ridge 68, although it is recognized that front and back surfaces 62, 64 could be formed as planar, angled surfaces.

As shown in FIGS. 7-9, center protrusion/flange 54 is generally divided into three portions. A center portion 72 is positioned in a center area of a lengthwise dimension of center protrusion 54, with a side portion 74 positioned on each end of center protrusion 54 and on either side of center portion 72. Each of the side portions 74 has a generally trapezoidal shape, with a top surface 76 that forms part of upper ridge 68 and that is generally parallel to bottom portion 34 of base 30, in the form of a planar surface. Center portion 72 of center protrusion 54 is positioned between side portions 74 and is configured so as to interrupt the planar surface of upper ridge 68 formed by top surface 76 of side portions 74. More particularly, center portion 72 is configured as a V-shaped notch 78 extending downward from the planar top surface 76 of the side portions 74. Thus, upper ridge 68 has a profile formed of planar surfaces 76 on side portions 74 with a V-shaped notch 78 positioned therebetween on center portion 72. As shown in FIGS. 7-9, center portion 72 is further formed to have a decreased thickness as compared to side portions 74 of center protrusion 54, such that center portion 72 functions to cut or break apart waste/debris forced thereon.

Also included in arrangement of protrusions 52 on body 32 is a pyramidal protrusion 80 extending upward from the bottom portion 34 of base 30 and having a point 82 generally aligned with the notch 78 formed in the center portion 72 of the center protrusion 54. Pyramidal protrusion 80 extends upward from the bottom portion 34 of base 30 and partially up center protrusion 54, such that point 82 of the pyramidal protrusion 80 is positioned below notch 78 of center portion 72. It is recognized, however, that pyramidal protrusion 80 could extend all the way up front and back surfaces 62, 64 of center protrusion 54, such that the pyramidal protrusion 80 comes to a point at a bottom of notch 78. As shown in FIGS. 7-9, front and back surfaces 62, 64 of center portion 72 of center protrusion 54 have channels or curvature features 84 formed therein extending downward from notch 78 and flaring outward in opposing directions to either side of pyramidal protrusion 80.

Pyramidal protrusion 80 is positioned on base 30 so as to be bisected by the center protrusion 54, such that a first portion 86 of the pyramidal protrusion 80 extends outwardly from front surface 62 of the center protrusion 54 and a second portion 88 of the pyramidal protrusion 80 extends outwardly from back surface 64 of the center protrusion 54. Each of the first and second portions 86, 88 of pyramidal protrusion 80 include thereon a pair of sloped surfaces, with the sloped surfaces of first portion 86 being identified as first and second sloped surfaces 90, 92 and the sloped surfaces of second portion 88 being identified as third and fourth sloped surfaces 94, 96. An edge 98 is formed on first portion 86 dividing the first and second sloped surfaces 90, 92, and an edge 98 is similarly formed on second portion 88 dividing the third and fourth sloped surfaces 94, 96.

Pyramidal protrusion 80 is oriented relative to center protrusion 54 such that edges 98 are aligned with notch 78 of center protrusion 54, thereby angling the sloped surfaces on each of the first and second portions 86, 88 of pyramidal protrusion 80 in opposing directions from notch 78. As such, the first portion 86 of the pyramidal protrusion 80 extending outwardly from the front surface 62 of the center protrusion 54 further divides the first region 58 of the cleat 28 into a first quadrant 100 and a second quadrant 102, and the second portion 88 of the pyramidal protrusion 80 extending outwardly from the back surface 64 of the center protrusion 54 further divides the second region 60 of the cleat 28 into a third quadrant 104 and a fourth quadrant 106. The first sloped surface 90 of the pyramidal protrusion 80 and the front surface 62 of the center protrusion 54 thus define the first quadrant 100, with the second sloped surface 92 of the pyramidal protrusion 80 and the front surface 62 of the center protrusion 54 defining the second quadrant 102, the third sloped surface 94 of the pyramidal protrusion 80 and the back surface 64 of the center protrusion 54 defining the third quadrant 104, and the fourth sloped surface 96 of the pyramidal protrusion 80 and the back surface 64 of the center protrusion 54 defining the fourth quadrant 106.

As shown in FIGS. 7-9, each of the four protrusion quadrants 100, 102, 104, 106 are angled away from other respective quadrants of the cleat 28 such that waste/debris forced onto body 32 is pushed in four distinct directions corresponding to the four protrusion quadrants. In operation, waste is pressed onto cleat 28 during rotation of compactor wheel 12 and is generally directed toward notch 78 formed in center portion 72 of center protrusion 54. Waste is then forced into four separate directions (i.e., into quadrants 100, 102, 104, 106) by way of center protrusion 54 and pyramidal protrusion 80, thus breaking apart waste as it is pressed onto cleat 28. As such, the amount of waste or debris that builds up on body 32 of cleat 28 is minimized and the compactor wheel 12 is kept cleaner.

Figure 10:
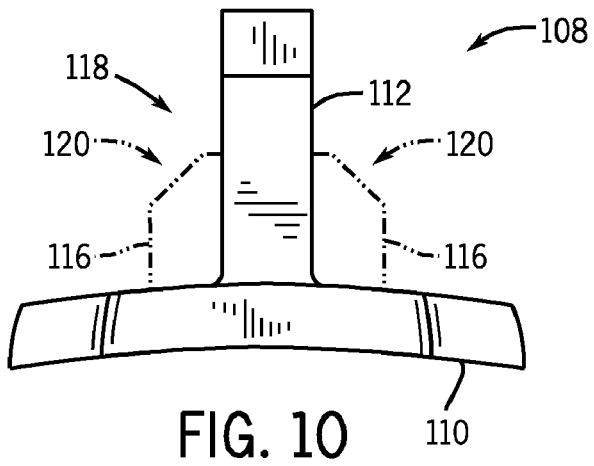
FIGS. 10-12 are views of a cleat base member according to another embodiment of the invention.
Figure 11:
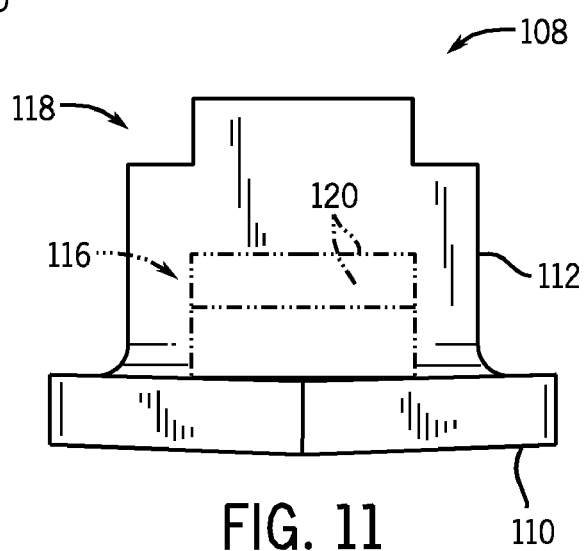
Figure 12:
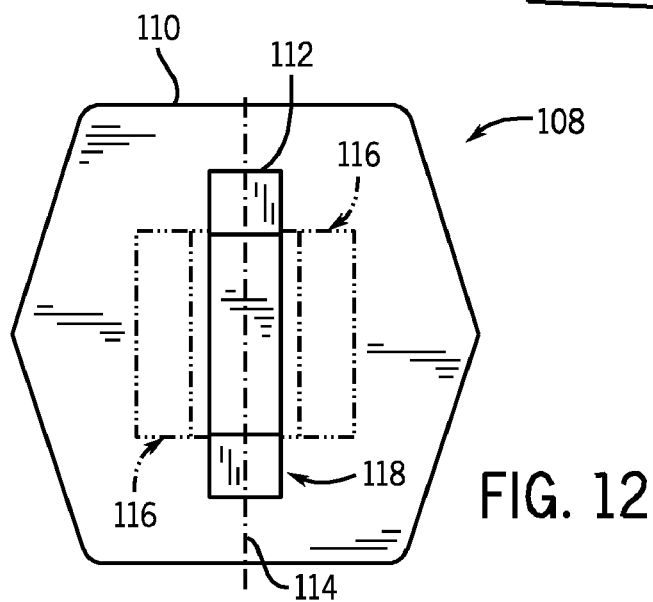

Referring now to FIGS. 10-12, a base 108 of cleat 28 is shown according to another embodiment of the invention. Base 108 includes a hexagonal shaped, planar bottom portion 110 that is adapted for welding to wrapper 19 (FIG. 1), and thus bottom portion 110 is arranged parallel to the wrapper. Base 108 also includes a base wall 112 extending up perpendicularly from the bottom portion 110 and radially outward from the wrapper. The base wall 112 is aligned along a center line 114 of bottom portion 110 so as to be centrally placed for receiving body 32 (FIGS. 7-9) thereon. The base wall 112 is formed to have a stepped configuration in order to conform to a general shape of body 32, thereby allowing base wall 112 to have a maximal height extending upward into body 32 for providing increased strength thereto.

According to an exemplary embodiment of the invention, and as shown in phantom in FIGS. 10-12, base 108 includes support walls 116 positioned on either side of base wall 112 to buttress the base wall and provide increased structural strength. Support walls 116 are formed to have a lower profile height than base wall 112, thereby forming a tapered wall structure 118 that generally matches a tapered structure of body 32 (FIGS. 7-9). According to an exemplary embodiment, support walls 116 have a chamfered top surface 120 that further tapers the design of the overall wall structure 118, thereby allowing support walls 116 to have a maximal height extending upward into body 32 for providing increased strength thereto.

Therefore, according to one embodiment of the invention, a compactor cleat mountable on a compactor wheel includes a base affixable to a compactor wheel and a body secured to the base and extending radially outward from the base, with the body comprising an arrangement of protrusions generally dividing the body into four protrusion quadrants. Each of the four protrusion quadrants is angled away from other respective protrusion quadrants such that forcing the protrusions of the cleat into a malleable material causes the malleable material to diversify along the four protrusion quadrants.

According to another embodiment of the invention, a compactor cleat mountable on a compactor wheel includes a base affixable to the compactor wheel and a body secured to the base. The body of the compactor cleat further includes a center protrusion extending upward from the base and generally dividing the cleat into an equal first region and a second region, wherein the center protrusion includes a front surface, a back surface, and two side surfaces that each extend up to a crest. The body of the compactor cleat also includes a pyramidal protrusion extending upward from the base, the pyramidal protrusion being bisected by the center protrusion such that a first portion of the pyramidal protrusion extends outwardly from the front surface of the center protrusion and a second portion of the pyramidal protrusion extends outwardly from the back surface of the center protrusion. The first portion of the pyramidal protrusion further divides the first region of the cleat into a first quadrant and a second quadrant, and wherein the second portion of the pyramidal protrusion further divides the second region of the cleat into a third quadrant and a fourth quadrant.

According to yet another embodiment of the invention, a compactor wheel mountable on an axle of a compaction machine includes a hub mountable to an axle of a compaction machine and a rim mounted around an outer circumference of the hub, the rim having a wrapper, an inner circumferential edge, and an outer circumferential edge. The compactor wheel also includes a plurality of cleats affixed to the wrapper, with each of the plurality of cleats further including a base affixable to a compactor wheel and a body secured to the base and extending radially outward from the compactor wheel, the body comprising an arrangement of protrusions generally dividing the body into four protrusion quadrants. Each of the four protrusion quadrants is angled away from other respective protrusion quadrants such that items forced onto the body are pushed in four distinct directions corresponding to the four protrusion quadrants.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compactor cleat mountable on a compactor wheel, the compactor cleat comprising:
    a base affixable to a compactor wheel; and
    a body secured to the base and extending radially outward from the base, the body comprising an arrangement of protrusions generally dividing the body into four protrusion quadrants;
    wherein each of the four protrusion quadrants is angled away from other respective protrusion quadrants such that forcing the protrusions of the cleat into a malleable material causes the malleable material to diversify along the four protrusion quadrants; and
    wherein the base comprises:
        a hexagonal shaped bottom portion; and
        at least one wall extending out perpendicularly from the bottom portion.

2. The compactor cleat of claim 1 wherein the arrangement of protrusions comprises a center flange extending upward from the base to form an upper ridge, the center flange generally aligned along a center line of the base.

3. The compactor cleat of claim 2 wherein the center flange includes a front surface, a back surface, and side surfaces extending between the base and the upper ridge, and wherein each of the front surface, the back surface, and the side surfaces slope downward and outward from the upper ridge to a perimeter of the base.

4. The compactor cleat of claim 3 wherein the center flange comprises:
    a pair of side portions positioned on opposing ends of the center flange, each of the pair of side portions having a planar top surface forming part of the upper ridge; and
    a center portion located between the side portions and including a top surface forming part of the upper ridge, the top surface of the center portion comprising a V-shaped notch that extends downward from the planar top surface of the side portions.

5. The compactor cleat of claim 4 wherein the arrangement of protrusions comprises a pyramidal protrusion extending upward from the base at least partially up along a height of the center flange, the pyramidal protrusion being bisected by the center flange and having an upper point being generally aligned with the V-shaped notch of the center portion.

6. The compactor cleat of claim 5 wherein the pyramidal protrusion comprises:
   a first portion extending outwardly from the front surface of the center flange, the first portion comprising first and second sloped surfaces; and
   a second portion extending outwardly from the back surface of the center flange, the second portion comprising third and fourth sloped surfaces.

7. The compactor cleat of claim 6 wherein the front surface of the center flange and the first sloped surface of the pyramidal protrusion define a first quadrant of the four protrusion quadrants, the front surface of the center flange and the second sloped surface of the pyramidal protrusion define a second quadrant of the four protrusion quadrants, the back surface of the center flange and the third sloped surface of the pyramidal protrusion define a third quadrant of the four protrusion quadrants, and the back surface of the center flange and the fourth sloped surface of the pyramidal protrusion define a fourth quadrant of the four protrusion quadrants.

8. The compactor cleat of claim 5 wherein the center portion comprises a plurality of curved channels formed therein on the front and back surfaces of the center flange, the curved channels extending downward from the V-shaped notch and flaring outwardly threrefrom to opposing sides of the pyramidal protrusion.

9. The compactor cleat of claim 1 wherein the at least one wall of the base comprises:
   a first wall having a pair of openings formed therein; and
   a second wall having a plurality of formations along opposing side edges and including at least one opening formed therein, the second wall bisecting the first wall at a right angle.

10. The compactor cleat of claim 9 wherein the body is constructed to extend through the openings of the first and second walls to secure the body to the base.

11. The compactor cleat of claim 1 wherein the base is formed of a first material and the body is formed of a second material different from the first material, the first material comprising a weldable metal and the second material comprising an abrasion resistant metal.

12. The compactor cleat of claim 1 wherein each of the four protrusion quadrants is angled away from other respective protrusion quadrants such that forcing the protrusions of the cleat into the malleable material causes the malleable material to be pushed in four distinct directions corresponding to the four protrusion quadrants.

13. A compactor cleat mountable on a compactor wheel, the compactor cleat comprising:
   a base affixable to the compactor wheel; and
   a body secured to the base, the body comprising:
      a center protrusion extending upward from the base and generally dividing the cleat into an equal first region and a second region, wherein the center protrusion includes a front surface, a back surface, and two side surfaces that each extend up to a crest; and
      a pyramidal protrusion extending upward from the base, the pyramidal protrusion being bisected by the center protrusion such that a first portion of the pyramidal protrusion extends outwardly from the front surface of the center protrusion and a second portion of the pyramidal protrusion extends outwardly from the back surface of the center protrusion;
   wherein the first portion of the pyramidal protrusion further divides the first region of the cleat into a first quadrant and a second quadrant, and wherein the second portion of the pyramidal protrusion further divides the second region of the cleat into a third quadrant and a fourth quadrant.

14. The compactor cleat of claim 13 wherein the crest comprises a planar surface having a notch formed in a central area thereof, the notch comprising a V-shaped notch extending downward from the planar surface.

15. The compactor cleat of claim 14 wherein the pyramidal protrusion comprises:
   a point generally aligned with the notch;
   and a pair of sloped surfaces formed on each of the first portion and the second portion of the pyramidal protrusion, the pair of sloped surfaces being divided by an edge such that the sloped surfaces are angled in opposing directions relative to the notch.

16. The compactor cleat of claim 13 wherein the base comprises:
   a hexagonal shaped bottom portion; and
   a wall structure extending out perpendicularly from the bottom portion, the wall portion configured to mate with the body, thereby securing the body to the base.

17. The compactor cleat of claim 16 wherein each of the front and back surfaces of the center protrusion comprise one of an angled surface and a curved surface sloping downwardly and outwardly from the crest to a perimeter of the hexagonal shaped bottom portion.

18. A compactor wheel mountable on an axle of a compaction machine, the compactor wheel comprising:
   a hub mountable to an axle of a compaction machine;
   a rim mounted around an outer circumference of the hub, the rim having a wrapper, an inner circumferential edge, and an outer circumferential edge; and
   a plurality of cleats affixed to the wrapper, each of the plurality of cleats further comprising:
      a base affixable to a compactor wheel; and
      a body secured to the base and extending radially outward from the compactor wheel, the body comprising an arrangement of protrusions generally dividing the body into four protrusion quadrants;
   wherein each of the four protrusion quadrants is angled away from other respective protrusion quadrants such that items forced onto the body are pushed in four distinct directions corresponding to the four protrusion quadrants; and
   wherein the arrangement of protrusions comprises a center flange extending upward from the base, the center flange positioned along a centerline of the base and having a top planar surface having a notch formed in a central area thereof, the notch comprising a V-shaped notch extending downward from the top planar surface.

19. The compactor wheel of claim 18 wherein the base comprises:
   a bottom portion being oriented parallel to the wrapper of the rim; and
   at least one wall extending perpendicular to the bottom portion and radially outward from the wrapper.

20. The compactor wheel of claim 19 wherein the arrangement of protrusions comprises:

a center flange extending upward from the bottom portion of the base, the center flange positioned along a centerline of the bottom portion; and a pyramidal protrusion extending upward from the bottom portion of the base and being bisected by the center flange such that first and second sloped surfaces of the pyramidal protrusion are positioned on a first side of the center flange and such that third and fourth sloped surfaces of the pyramidal protrusion are positioned on a second side of the center flange;

wherein the center flange and the pyramidal protrusion divide the body into four quadrants, with each quadrant being angled away from other respective quadrants.

21. The compactor wheel of claim 20 wherein:

the first sloped surface of the pyramidal protrusion and the first side of the center flange define a first quadrant;

the second sloped surface of the pyramidal protrusion and the first side of the center flange define a second quadrant;

the third sloped surface of the pyramidal protrusion and the second side of the center flange define a third quadrant; and the fourth sloped surface of the pyramidal protrusion and the second side of the center flange define a fourth quadrant.

22. A compactor cleat mountable on a compactor wheel, the compactor cleat comprising:

a base affixable to a compactor wheel; and a body secured to the base and extending radially outward from the base, the body comprising an arrangement of protrusions generally dividing the body into four protrusion quadrants;

wherein each of the four protrusion quadrants is angled away from other respective protrusion quadrants such that forcing the protrusions of the cleat into a malleable material causes the malleable material to diversify along the four protrusion quadrants;

wherein the arrangement of protrusions comprises a center flange extending upward from the base to form an upper ridge, the center flange generally aligned along a center line of the base and including:

a front surface, a back surface, and side surfaces extending between the base and the upper ridge, and wherein each of the front surface, the back surface, and the side surfaces slope downward and outward from the upper ridge to a perimeter of the base;

a pair of side portions positioned on opposing ends of the center flange, each of the pair of side portions having a planar top surface forming part of the upper ridge; and a center portion located between the side portions and including a top surface forming part of the upper ridge, the top surface of the center portion comprising a V- shaped notch that extends downward from the planar top surface of the side portions.

\* \* \* \* \*